United States Patent [19]

Stephenson, III et al.

[11] Patent Number: 5,638,152

[45] Date of Patent: Jun. 10, 1997

[54] BI-DIRECTIONAL SPRING DEVICE FOR OPENING AND CLOSING LIGHT SHIELD OF FILM CASSETTE

[75] Inventors: Stanley W. Stephenson, III, Spencerport; Tom M. Seamans, Corfu, both of N.Y.

[73] Assignee: Eastman Kodak Company, Rochester, N.Y.

[21] Appl. No.: 602,192

[22] Filed: Feb. 16, 1996

[51] Int. Cl.⁶ .................................................. G03B 17/26
[52] U.S. Cl. .................................... 396/513; 396/538
[58] Field of Search ............................... 354/275, 277

[56] References Cited

U.S. PATENT DOCUMENTS

| | | |
|---|---|---|
| 577,593 | 2/1897 | Bronson et al. . |
| 698,172 | 4/1902 | Bornmann . |
| 1,437,989 | 12/1922 | Nelson . |
| 1,524,081 | 1/1925 | Bornmann . |
| 5,231,438 | 7/1993 | Smart . |
| 5,270,757 | 12/1993 | Tosaka et al. . |
| 5,319,406 | 6/1994 | Takatori ................................ 354/275 |
| 5,357,303 | 10/1994 | Wirt . |
| 5,359,378 | 10/1994 | Zander et al. . |
| 5,452,038 | 9/1995 | Csaszar et al. ........................ 354/275 |
| 5,495,310 | 2/1996 | Takatori ................................ 354/288 |

*Primary Examiner*—Howard B. Blankenship
*Attorney, Agent, or Firm*—Roger A. Fields

[57] ABSTRACT

A bi-directional driver device for opening and closing a light shield of a film cassette is alternately biased open and closed via an overcenter spring, to open and close the light shield. The final opening torque the spring exerts against the driver device when the light shield is completely opened is substantially less than the final closing torque the spring exerts against the driver device when the light shield is completely closed. Thus, the final opening torque will not cause any deformation of the light shield that might allow light leakage into the cassette interior when the light shield is closed.

6 Claims, 8 Drawing Sheets

5,638,152

BI-DIRECTIONAL SPRING DEVICE FOR OPENING AND CLOSING LIGHT SHIELD OF FILM CASSETTE

FIELD OF THE INVENTION

The invention relates generally to the field of photography, and in particular to a driver device for opening and closing a light shield of a film cassette.

BACKGROUND OF THE INVENTION

It is known to provide a film cassette with a light shield that can be closed to prevent ambient light from entering the cassette interior and can be opened to permit film movement out of and into the cassette interior.

For example, commonly assigned prior art U.S. Pat. No. 5,357,303, issued Oct. 18, 1994, and U.S. Pat. No. 5,359,378, issued Oct. 25, 1994, each disclose a film cassette including a plastic light shield that can be rotated closed to prevent ambient light from entering the cassette interior and can be rotated open to allow film movement out of and into the cassette interior, and an auxiliary driver device of a camera which is engageable with the light shield to rotate the light shield open and closed when the film cassette is loaded in the camera.

Preferably, when the plastic light shield is opened the driver device should continue to exert an opening torque force against the light shield to hold the light shield open, and when the light shield is closed the driver device should continue to exert a closing torque force against the light shield to hold the light shield closed. However, there is a possibility that the opening torque force will deform the light shield when it is open. Thus, when the light shield is closed, some light leakage into the cassette interior may result.

SUMMARY OF THE INVENTION

A bi-directional device for use with a film cassette that has a light shield supported for closing to prevent ambient light from entering the cassette interior and for opening to permit film movement out of and into the cassette interior, comprises a driver engageable with the light shield for movement in opposite directions to open and close the light shield, and is characterized by:

bi-directional means for exerting opening and closing forces against the driver to move the driver to open and close the light shield, and reducing the opening force to a relatively low magnitude when the light shield is opened in order to hold the light shield open without deforming it.

DETAILED DESCRIPTION OF THE INVENTION

Figure 1:
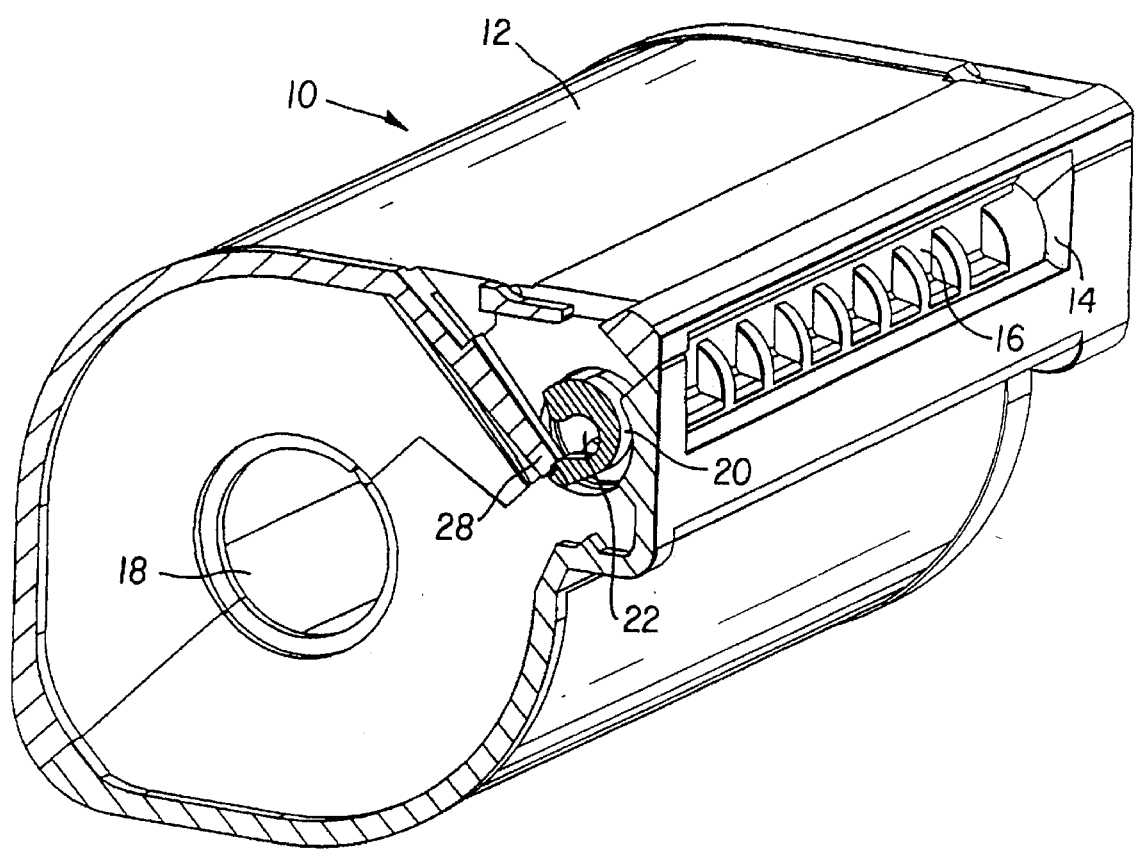
FIG. 1 is a perspective view of a film cassette including a light shield supported for closing to prevent ambient light from entering the cassette interior and for opening to permit film movement out of and into the cassette interior, showing the light shield closed.
Figure 2:
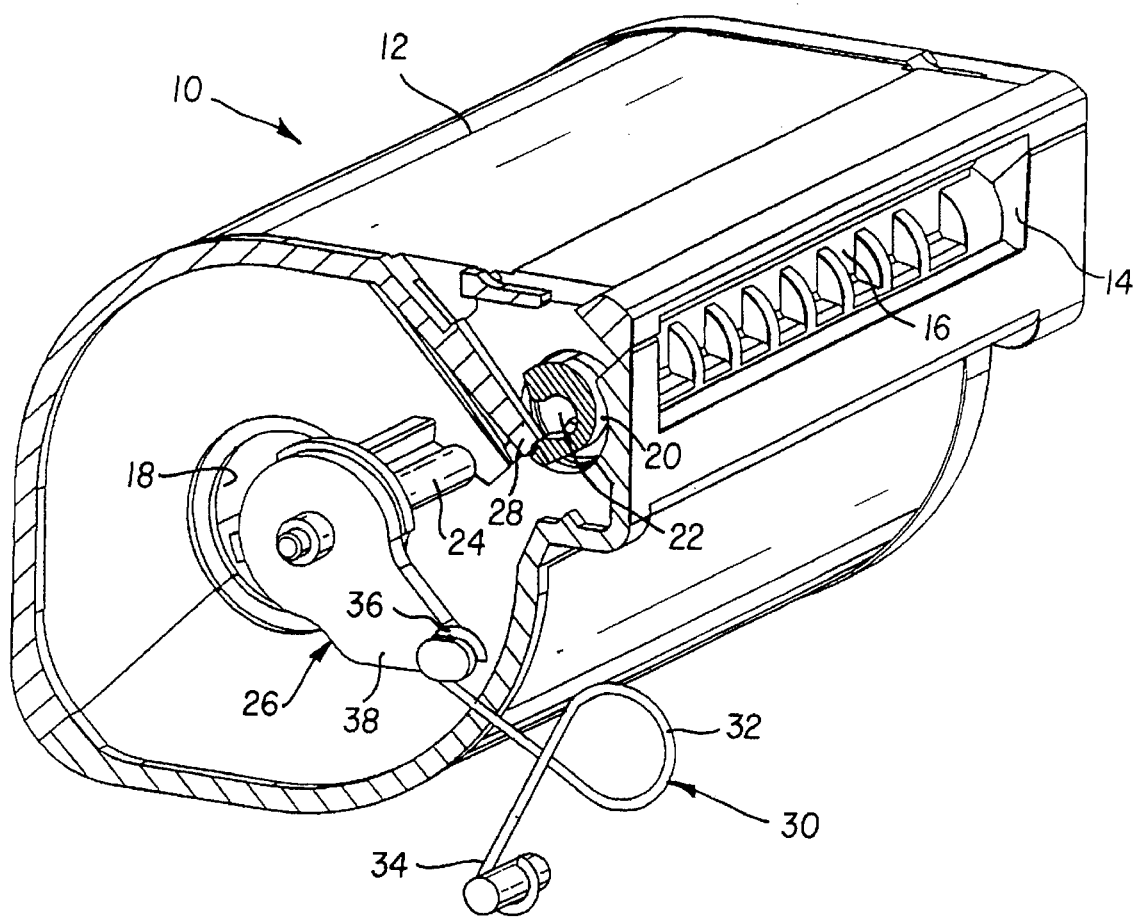
FIG. 2 is a perspective view similar to FIG. 1 with the addition of a bi-directional overcenter spring device positioned to engage the closed light shield to rotate the light shield open.

As shown in FIGS. 1–4 of the drawings, a film cassette 10 comprises a cassette shell or housing 12 with a film ingress/egress slot 14, a plastic light shield 16, and a film spool 18.

Figure 6:
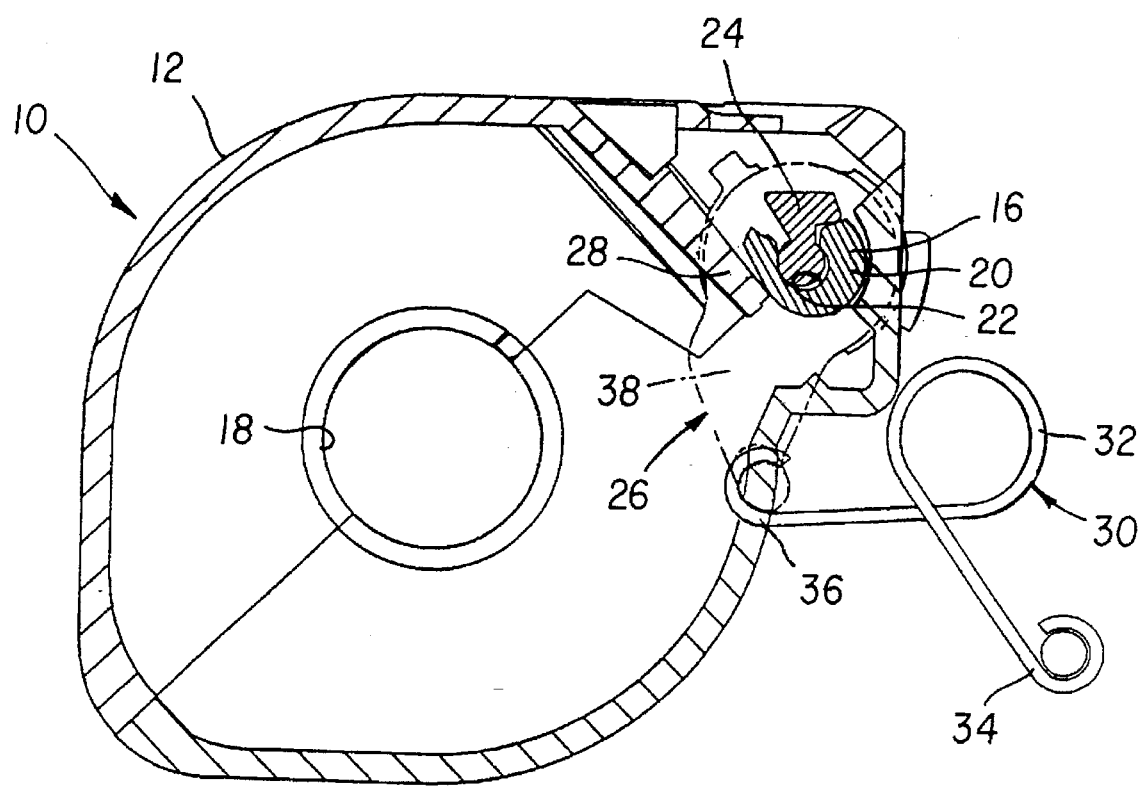
FIG. 6 is a plan view similar to FIG. 5, showing the overcenter spring device after having rotated the light shield completely open.
Figure 7:
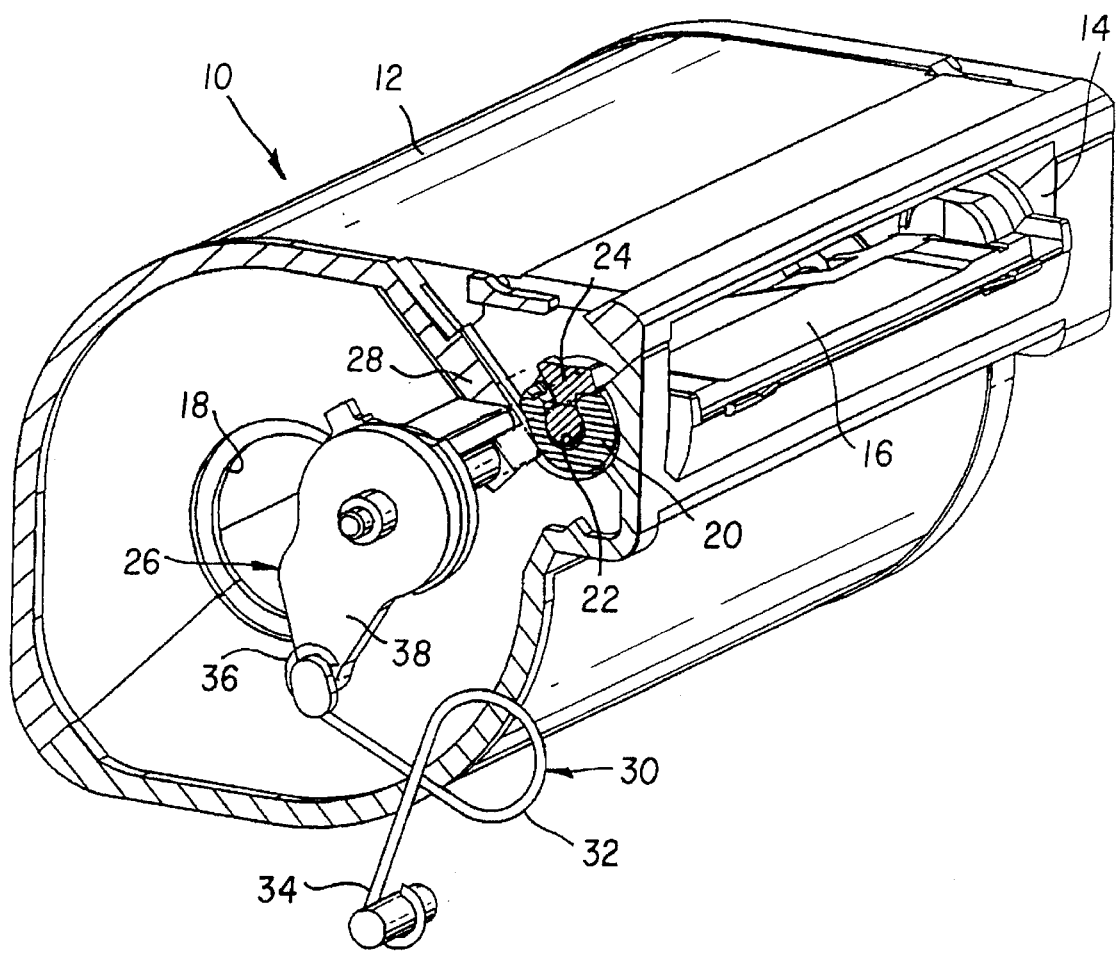
FIG. 7 is a perspective view similar to FIG. 6.

The light shield 16 has a pair of opposite end posts 20 (only one shown) which are supported via the cassette shell 12 to enable the light shield to be rotated closed as depicted in FIGS. 1–4, to prevent ambient light from entering the shell interior through the film ingress/egress slot 14, and to be rotated open as depicted in FIGS. 6 and 7, to permit film movement out of and into the shell interior through the film egress/ingress slot (in a camera, for example, as suggested in commonly assigned prior art U.S. Pat. No. 5,231,438, issued Jul. 27, 1993).

As shown in FIGS. 1–4, one of the end posts 20 of the light shield 16 has a coaxial cavity 22 for receiving a driver stem 24 of a rotary driver device 26 (in a camera, for example, as suggested in prior art U.S. Pat. No. 5,231,438) to engagingly rotate the light shield open and closed (when the film cassette 1 is loaded in the camera). Also, see prior art U.S. Pat. No. 5,357,303 and U.S. Pat. No. 5,359,378.

A locking pawl 28 protrudes slightly into the coaxial cavity 22 to secure the light shield 16 closed. See FIGS. 1 and 2. The locking pawl 28 is resilient to permit it to be displaced from the coaxial cavity 22 by the driver stem 24, to release the closed light shield 16, when the driver stem is received in the coaxial cavity 22. See FIGS. 3 and 4, The rotary driver device 26 includes an overcenter spring 30 having a looped portion 32 between one leg-end 34 which is fixed and another leg-end 36 which is connected to a driver handle 38 of the driver device.

Operation

Figure 3:
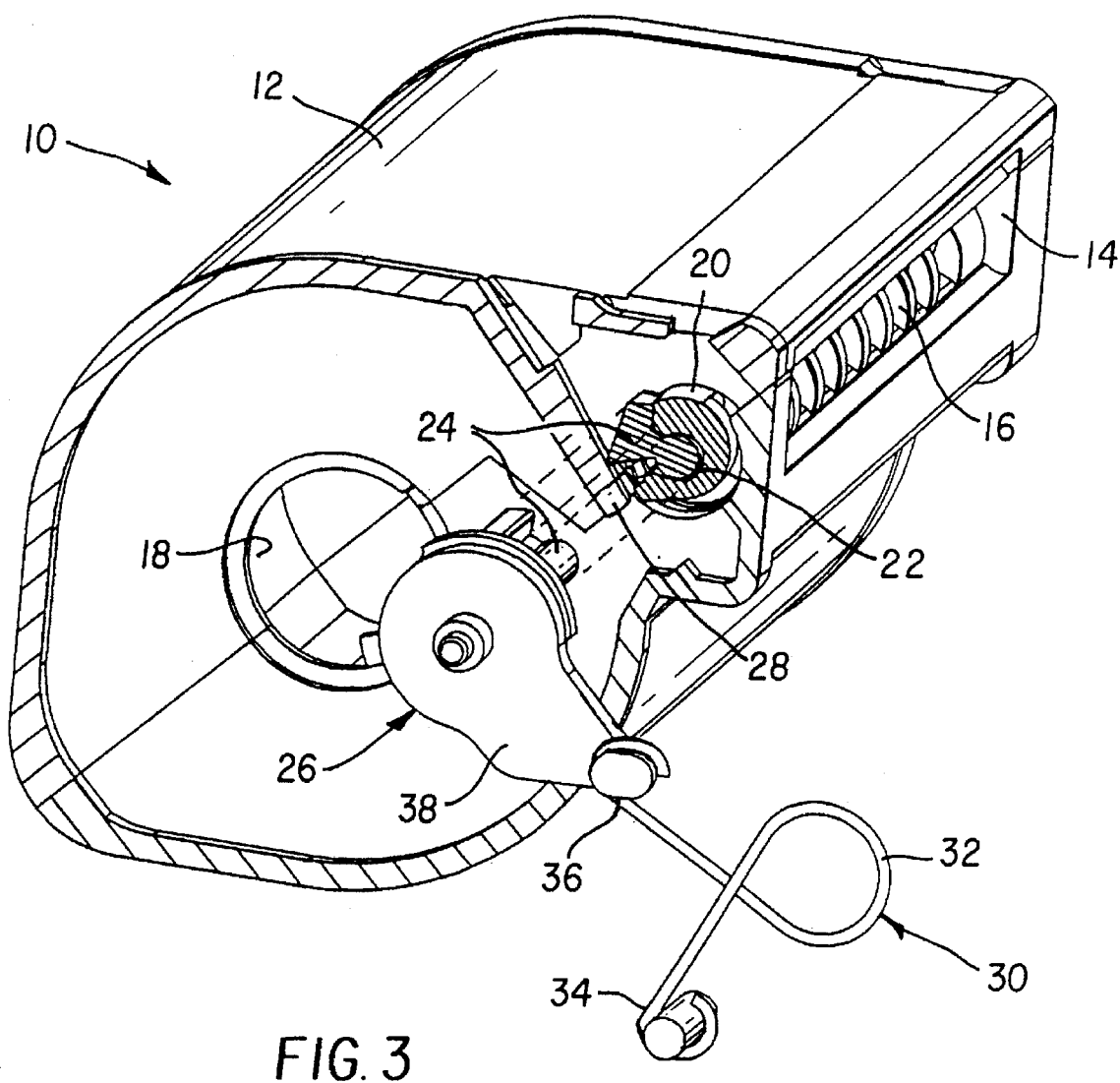
FIG. 3 is a perspective view similar to FIG. 2, showing the overcenter spring device engaging the closed light shield.
Figure 4:
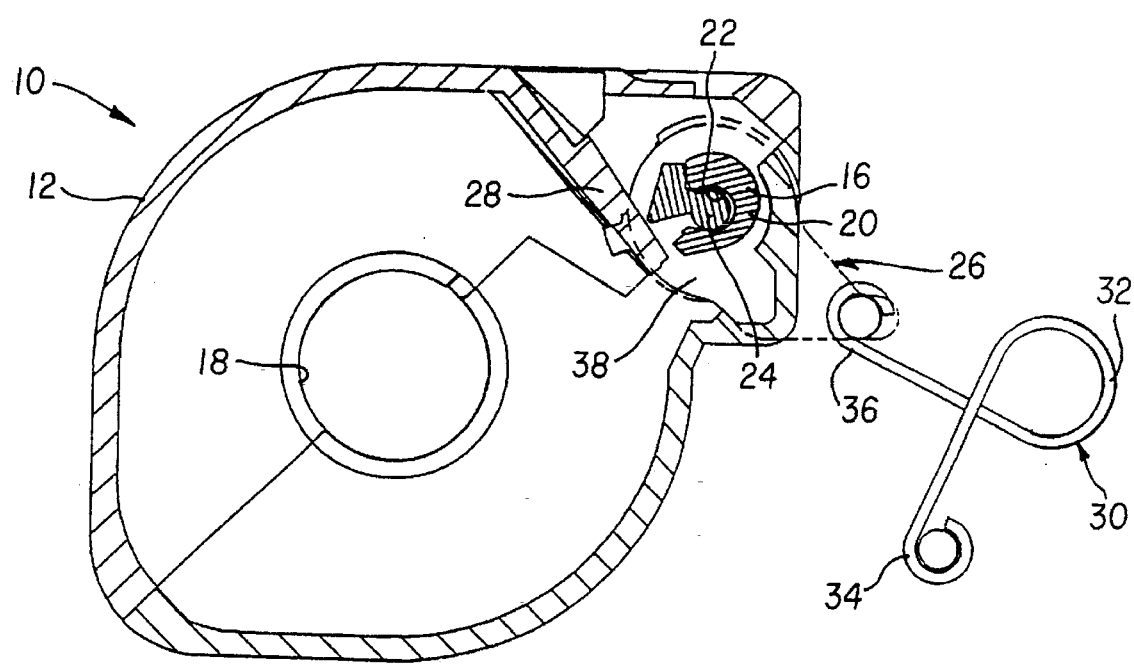
FIG. 4 is a plan view similar to FIG. 3, showing the overcenter spring device engaging the closed light shield.

When the driver stem 24 is received in the coaxial cavity 22 as shown in FIGS. 3 and 4, the driver stem pushes the locking pawl 28 out of the coaxial cavity. This frees the closed light shield 16 to be rotated open in a clockwise direction as viewed in FIGS. 3 and 4.

Figure 5:
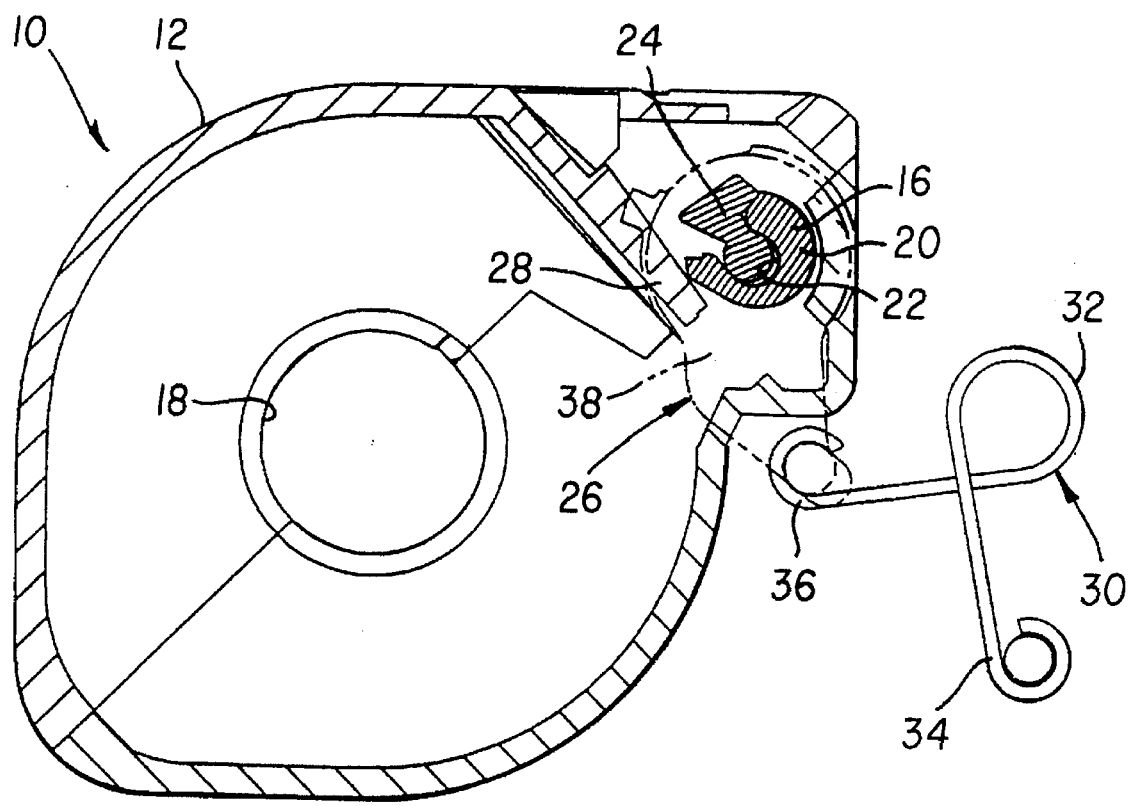
FIG. 5 is a plan view similar to FIG. 4, showing the overcenter spring device after having rotated the light shield partly open.
Figure 8:
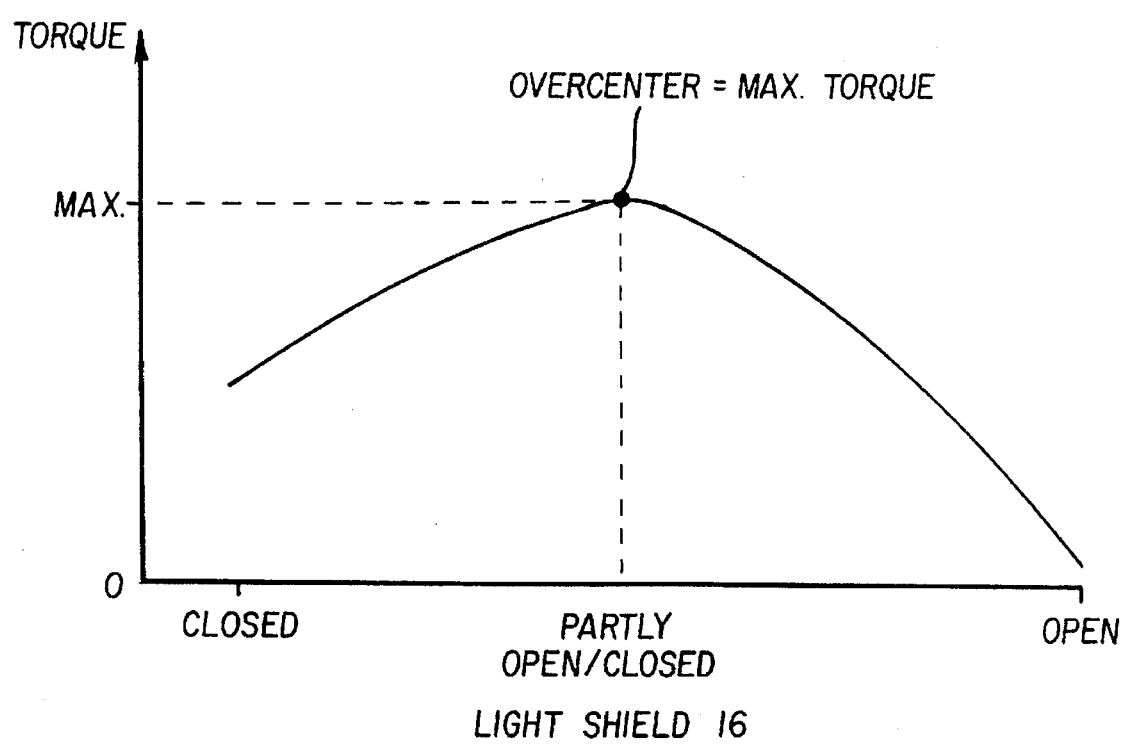
FIG. 8 is graph of overcenter spring torque vs. opening/closing of the light shield.

Initial rotation of the rotary driver device 26 in the clockwise direction begins to similarly rotate the closed light shield 16 open against a contrary urging, i.e. a closing torque force, exerted by the overcenter spring 30 against the driver handle 38. The closing torque force of the overcenter spring 30 increases as the driver device 26 is further rotated to continue to open the light shield 16. See FIG. 8. When the overcenter spring 30 is stressed to an overcenter or mid-center condition as shown in FIG. 5, the driver device 26 has been rotated to only partly open the light shield 16. At this time the overcenter spring 30 undergoes a change or transition from exerting a maximum closing torque force against the driver handle 38 to exerting a maximum opening torque force against the driver handle. See FIG. 8.

The overcenter spring 30 then begins to rotate the rotary driver device 26 in the clockwise direction to similarly rotate the light shield 16 completely open as shown in FIGS. 6 and 7. The opening torque force the overcenter spring 30 exerts against the driver handle 38 is reduced from the maximum opening force to a final minimum one when the light shield 16 is completely opened. See FIG. 8. The final opening force has a relatively low magnitude that is slightly above "0" torque. Consequently, the final opening force cannot cause any deformation of the light shield 16 which would allow light leakage into the cassette interior when the light shield is closed. However, the final opening force is sufficient to maintain the light shield 16 completely open.

To close the light shield 16, the rotary driver device 26 is rotated in a counter-clockwise direction as viewed in FIGS. 6 and 7 to similarly rotate the light shield against the contrary urging, i.e. the opening torque force, exerted by the overcenter spring 30 against the driver handle 38. The opening torque force of the overcenter spring 30 increases as the driver device 26 is further rotated to continue to close the light shield 16. See FIG. 8. When the overcenter spring 30 is stressed to the overcenter or midcenter condition as shown in FIG. 5, the driver device 26 has been rotated to only partly close the light shield 16. At this time the overcenter spring 30 undergoes a change or transition from exerting the maximum opening torque force against the driver handle 38 to exerting the maximum closing torque force against the driver handle. See FIG. 8.

The overcenter spring 30 then begins to rotate the rotary driver device 26 in the counter-clockwise direction to similarly rotate the light shield 16 completely closed as shown in FIGS. 3 and 4. The closing torque force the overcenter spring 30 exerts against the driver handle 38 is reduced from the maximum closing force to a final minimum one when the light shield 16 is completely closed. See FIG. 8. The final closing force has a magnitude that is substantially above "0" torque and, thus, is substantial greater than the magnitude of the final opening force. The reason for this difference is that any deformation of the light shield 16 the final closing force might cause would not allow light leakage into the cassette interior when the light shield is closed.

The invention has been described with reference to a preferred embodiment. However, it will be appreciated that variations and modifications can be effected by a person of ordinary skill in the art without departing from the scope of the invention.

Parts List 10. film cassette
12. cassette shell
14. film egress/ingress slot
16. light shield
18. film spool
20. shield end post
22. coxial cavity
24. driver stem
26. rotary driver device
28. locking pawl
30. overcenter spring
32. spring looped portion
34. spring leg-end
36. spring leg-end

We claim:

1. A bi-directional device for use with a film cassette that has a light shield supported for closing to prevent ambient light from entering the cassette interior and for opening to permit film movement out of and into the cassette interior, comprises a driver engageable with the light shield for movement in opposite directions to open and close the light shield, and is characterized by:

bi-directional spring means for exerting opening and closing elastic forces against said driver to move the driver to open and close the light shield, and reducing the opening elastic force to a magnitude low enough when the light shield is opened to hold the light shield open without deforming it.

2. A bi-directional device as recited in claim 1, wherein said bi-directional spring means gradually diminishes the opening elastic force as the light lock is moved open.

3. A bi-directional device as recited in claim 1, wherein said bi-directional spring means reduces the closing elastic force to a magnitude when the light lock is closed which is not as low as the magnitude the opening elastic force is reduced to when the light lock is opened.

4. A hi-directional device as recited in claim 1, wherein said hi-directional spring means includes an overcenter spring having one end fixed and another end connected to said driver for exerting the opening and closing elastic forces against the driver.

5. A bi-directional device for use with a film cassette that has a light shield rotatably supported for closing to prevent ambient light from entering the cassette interior and for opening to permit film movement out of and into the cassette interior, comprises a driver engageable with the light shield for rotational movement in opposite directions to open and close the light shield, and is characterized by:

bi-directional overcenter spring means for alternately exerting variable opening and closing torque forces against said driver to rotate the driver to open and close the light shield, and reducing the opening torque force to a final one when the light shield is opened which is substantially less than a final one the closing torque force is reduced to when the light shield is closed.

6. A method of closing a light shield of a film cassette to prevent ambient light from entering the cassette interior and of opening the light shield to permit film movement out of and into the cassette interior, comprising:

exerting respective, bi-directional, opening and closing elastic forces against a driver in engagement with the light shield to move the driver to open and close the light shield; and reducing the opening elastic force against the driver to a final one when the light shield is opened which is substantially less than a final one the closing elastic force against the driver is reduced to when the light shield is closed, in order to prevent any deformation of the light shield that would allow light leakage into the cassette interior when the light shield is closed.

* * * * *